(12) United States Patent
Iwamura

(10) Patent No.: US 6,666,247 B2
(45) Date of Patent: Dec. 23, 2003

(54) PNEUMATIC TIRE INCLUDING SHORT FIBERS

(75) Inventor: Wako Iwamura, Kobe (JP)

(73) Assignee: Sumitomo Rubber Industries, Ltd., Hyogo-Ken (JP)

(*) Notice: Subject to any disclaimer, the term of this patent is extended or adjusted under 35 U.S.C. 154(b) by 0 days.

(21) Appl. No.: 09/735,646

(22) Filed: Dec. 14, 2000

(65) Prior Publication Data

US 2001/0004911 A1 Jun. 28, 2001

(30) Foreign Application Priority Data

Dec. 14, 1999 (JP) .......................................... 11-354846

(51) Int. Cl.[7] .............................. B60C 1/00; B60C 9/12; B60C 11/00
(52) U.S. Cl. ............................... 152/209.4; 152/209.5; 152/458
(58) Field of Search ..................... 152/209.4, 209.5, 152/211, 212, 458

(56) References Cited

U.S. PATENT DOCUMENTS

| | | | |
|---|---|---|---|
| 1,037,311 A | * | 9/1912 | Pratt |
| 1,935,519 A | * | 11/1933 | Quinn |
| 5,526,859 A | * | 6/1996 | Saito et al. |
| 5,702,546 A | * | 12/1997 | Itoh et al. |
| 5,967,211 A | * | 10/1999 | Lucas et al. |
| 5,975,173 A | * | 11/1999 | Izumoto et al. |
| 6,336,487 B1 | * | 1/2002 | Teratani et al. |
| 6,374,885 B1 | * | 4/2002 | Uchida et al. |

FOREIGN PATENT DOCUMENTS

| | | | |
|---|---|---|---|
| CA | 2049784 | * | 3/1992 |
| EP | 846576 | * | 6/1998 |
| FR | 400962 | * | 8/1909 |
| JP | 61-119409 | * | 6/1986 |
| JP | 62-191204 | * | 8/1987 |
| JP | 2-274602 | * | 11/1990 |
| JP | 3-258603 | * | 11/1991 |
| JP | 7-61209 | * | 3/1995 |
| JP | 9-193618 | * | 7/1997 |
| JP | 10-129214 | * | 5/1998 |

* cited by examiner

*Primary Examiner*—Steven D. Maki
(74) *Attorney, Agent, or Firm*—Birch, Stewart, Kolasch & Birch, LLP

(57) ABSTRACT

A pneumatic tire comprises: a tread rubber having a blended rubber portion constituted by a short fiber blended rubber obtained by adding a nonmetal short fiber to a rubber base material forming a tread surface and having a rubber hardness Hs1 (a durometer A hardness) at 25 deg. C. of 58 to 72 degrees; the short fiber being harder than an ice and having an average fiber diameter of 5 to 50 micrometers, an average length of 0.05 to 5.0 mm and a blended amount with respect to a rubber base material 100 weight portion of 2 to 20 weight portion; and the blended rubber portion being provided with a base portion obtained by directing said short fiber in a tread thickness direction, and a surface portion arranged in a radially outer side of the base portion so as to form the tread surface and obtained by directing said short fiber in a direction parallel to said tread surface.

4 Claims, 3 Drawing Sheets

Thickness direction

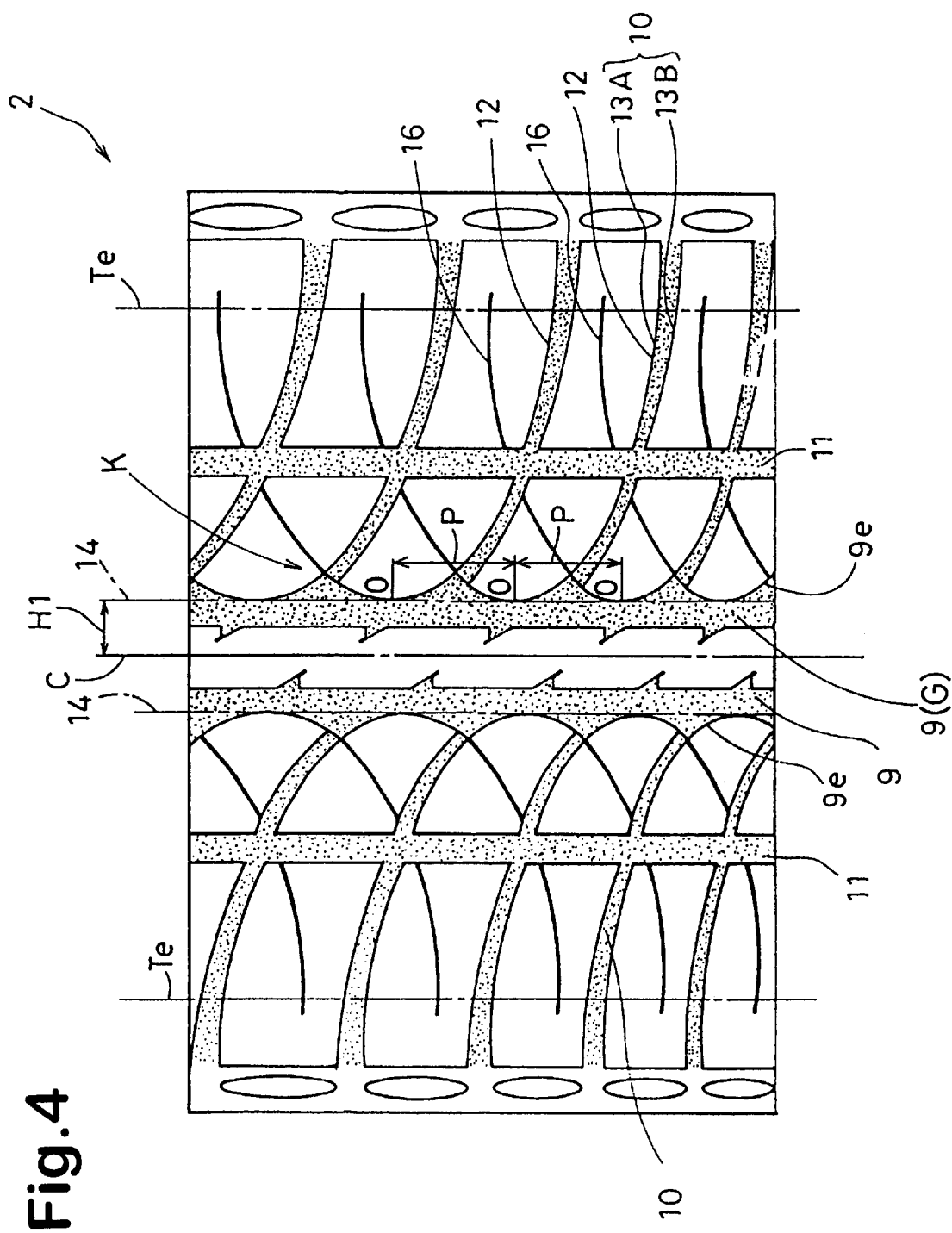

PNEUMATIC TIRE INCLUDING SHORT FIBERS

FIELD OF THE INVENTION

The present invention relates to a pneumatic tire which can be preferably used as an all season tire and has a traveling performance on an ice and snow road while keeping a traveling performance on a normal road such as wet and dry roads or the like high.

DESCRIPTION OF THE PRIOR ART

In general, a tire for passenger cars can be classified into a summer tire in which a traveling performance on a normal road such as the wet and dry roads and the like (in some cases called as a summer performance) is taken into consideration, a studless tire in which a traveling performance on an ice and snow road (in some cases called as an ice and snow performance) is particularly obtained, and an all season tire in which both of the traveling performances are taken into consideration.

Here, in the studless tire, in general, in order to provide with a sufficient grip force on the ice and snow road, an adhesion friction force between the tire and the ice surface is increased by employing a block pattern by which a sea area ratio corresponding to a rate of a tread groove occupied in a tread ground plane is increased and forming a multiplicity of sipes in the block so as to increase a road surface scratching and excavating friction force (an edge effect) by the block and an edge of the sipe, or using a soft rubber capable of keeping a flexibility (being excellent in a low temperature characteristic) even at a low temperature for the tread rubber so as to increase an adhesion friction force between the tire and the ice surface.

However, all of these methods tend to widely deteriorate the summer performance mentioned above, for example, cause a reduction of rigidity in the tread portion, make a cornering force insufficient and the like. Accordingly, in the all season tire which is designed by using these methods and has an intermediate nature between the summer tire and the studless tire, the summer performance is largely less than the summer tire and the ice and snow performance is largely less than the studless tire, thereby making it hard to be allowed on the market.

SUMMARY OF THE INVENTION

Accordingly, an object of the present invention is to provide a pneumatic tire which can achieve an ice and snow performance while keeping an summer performance corresponding to that of the conventional summer tire and can be preferably used as an all season tire.

BRIEF DESCRIPTION OF THE DRAWINGS

FIG. 4 is a plan view showing an embodiment of a tread pattern preferable for a tire in accordance with the present invention.

DESCRIPTION OF THE PREFERRED EMBODIMENTS

A description will be given of an embodiment in accordance with the present invention together with illustrated examples.

Figure 1:
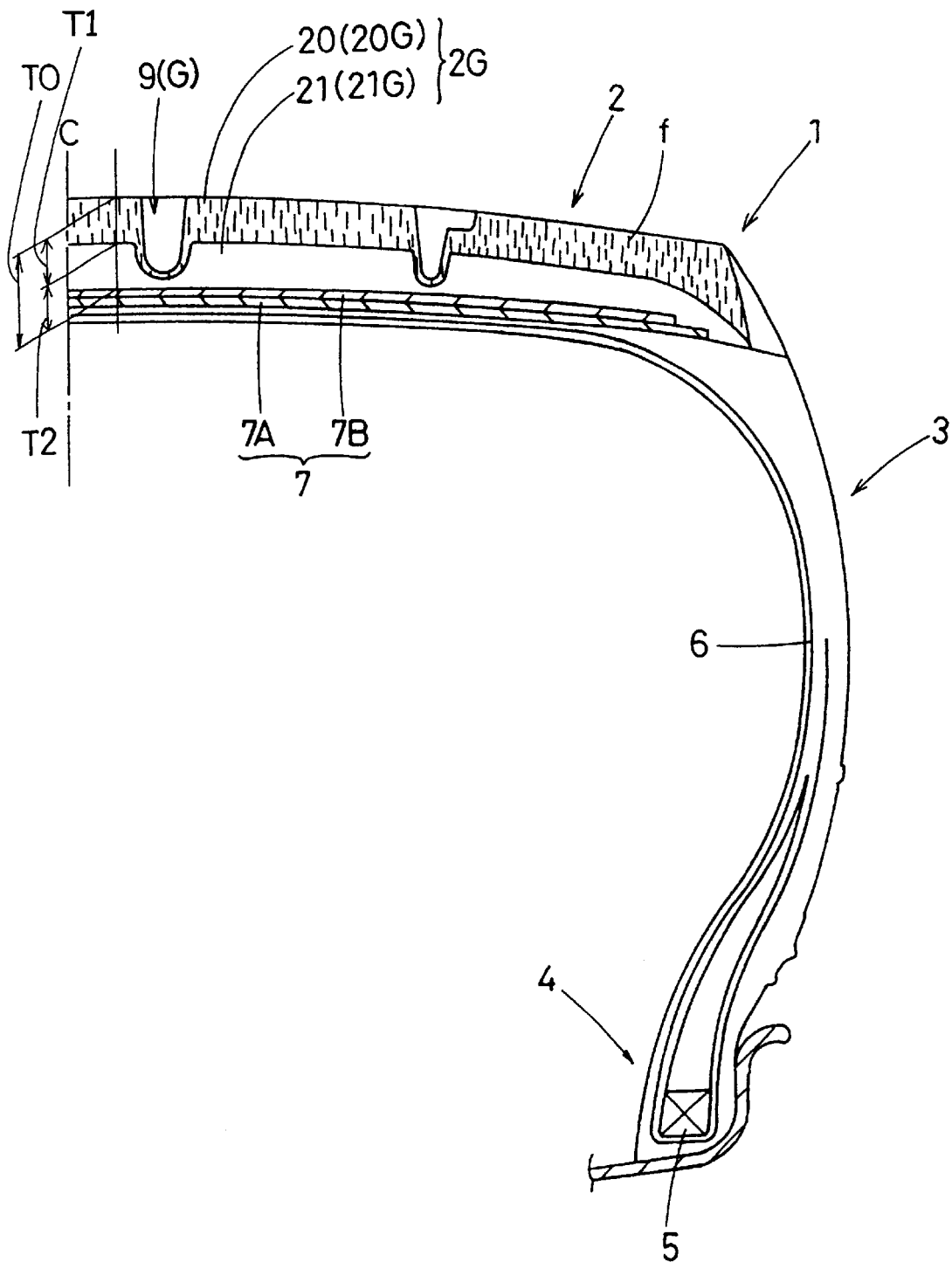
FIG. 1 is a cross sectional view of a tire in accordance with an embodiment of the present invention.

FIG. 1 shows a meridian cross section in the case that a pneumatic tire 1 in accordance with the present invention is formed as an all season tire.

In FIG. 1, the tire 1 is provided with a tread portion 2, a pair of side wall portions extending to an inner portion in a tire radial direction from both ends thereof and bead portions 4 arranged in inner ends in the tire radial direction of the respective side wall portion 3, and is reinforced by code layers including carcasses 6 extending between the bead portions 4 and 4 and belt layers 7 arranged in outer sides in a radial direction of the carcasses 6.

The carcass 6 is constituted by one or more, in the present embodiment one, carcass ply extending from the tread portion 2 through the side wall portion 2 and folded around a bead core 5 of the bead portion 4, and this carcass ply arranges the carcass cord at an angle between 75 and 90 degrees with respect to a tire equator C. As the carcass cord, a steel cord can be employed, and also may be employed an organic fiber cord such as an aromatic polyamide, a nylon, a rayon, a polyester or the like. In the present embodiment, a case of a polyester fiber cord will be exemplified.

Further, the belt layer 7 is constituted by two or more, in the present embodiment two, belt plies 7A and 7B arranging belt cords having a high strength at an angle between 10 and 35 degrees with respect to the tire equator C, and the respective belt cords cross to each other between the plies, thereby forming a truss structure, whereby the belt layer 7 has a hoop effect so as to reinforce the tread portion 2. In the present embodiment, a case of employing the steel cord as the belt cord will be exemplified.

Next, in the pneumatic tire 1 in accordance with the present invention, in order to apply the ice and snow performance while keeping the summer performance corresponding to that of the conventional summer tire, a tread rubber 2G is provided with at least a blended rubber portion 20 of thickness T1 constituted by a short fiber blended rubber 20G containing a nonmetal short fiber f.

Figure 2:
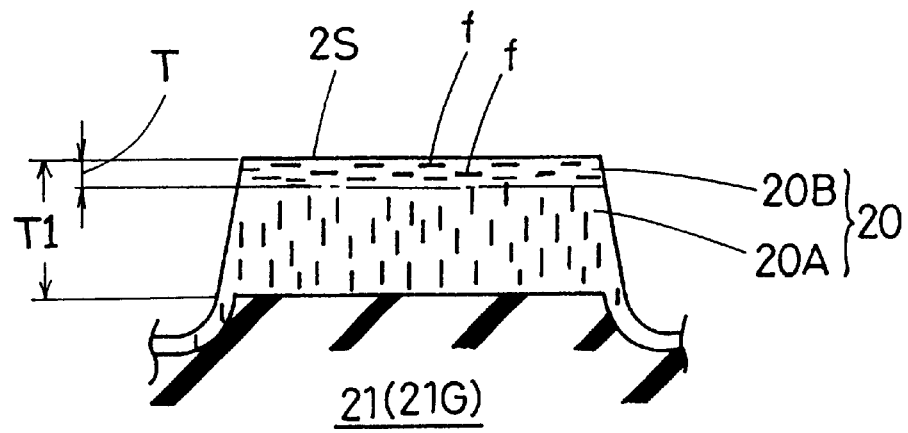
FIG. 2 is a cross sectional view showing a tread portion in an enlarged manner.

Further, the blended rubber portion 20 is, as shown in FIG. 2, provided with a base portion 20A in which the short fiber f mentioned above is directed in a direction perpendicular to a tread surface 2S (hereinafter, refer to as a tread thickness direction), and a surface portion 20B arranged in an outer side in a radial direction of the base portion 20A so as to form the tread surface 2S and in which the short fiber f mentioned above is directed in a direction parallel to a tread surface S (hereinafter, refer to as a tread surface direction).

In general, the all season tire is attached to a vehicle during a period that no snow falls, whereby a snow season comes after the tire runs over a certain degree of traveling distance. Accordingly, it is advantageous that the summer performance is considered to be more important than the ice and snow performance at the beginning of use, so that in the present embodiment, the surface portion 20B is formed in the outer side of the base portion 20A intending to achieve both of the ice and snow performance and the summer performance in order to rather improve the summer performance. Therefore, in order to wear out the surface portion 20B prior to the snow season, it is preferable to set a thickness T thereof to 0.2 to 1.0 mm.

Further, as a rubber base material employed for the short fiber blended rubber 20G, there can be listed up, for example, a diene rubber such as a natural rubber, an isoprene rubber, a styrene-butadiene rubber, a butadiene rubber, a chloroprene rubber, an acrylonitrile-butadiene rubber or the like.

Further, as the blended short fiber f, it is necessary to be harder than the ice, an organic fiber such as a nylon or the like can not be used, and a metal fiber harder than the road surface is not preferable because the metal fiber injures the road surface. Accordingly, it is unavoidable for securing an excellent road holding with respect to the ice and snow road to use a nonmetal short fiber f having an abrasion speed with a small difference from that of the rubber, and an inorganic material is preferable for the short fiber f. In particular, since a glass fiber or a carbon fiber is bent and cut to a proper length in a process of blending the rubber so as to become short, it is preferable due to easiness of dispersion and direction.

Further, an average fiber diameter of the short fiber f is within a range between 5 and 50 micrometers and is preferable to be set to 5 to 15 micrometers, and an average fiber length of the short fiber f is within a range between 0.05 and 5.0 mm and is preferable to be set to 0.2 to 2.0 mm.

By directing the short fiber f in the tread thickness direction, it is possible to keep a flexibility following to a fine unevenness on the road surface and it is possible to improve an adhesion friction, reducing the affection by the fiber f on the tread surface 2S. Further, since a road holding pressure is applied to the longitudinal direction of the short fiber f, a portion locally having a high road holding pressure is generated by and near the short fiber f. Accordingly, for example, there is generated a wiping effect such as pushing out a water film generated between the ice road surface and the tread surface, so as to further improve an adhesion and cohesion friction and it is possible to simultaneously improve a road surface scratching and excavating frictional force by the protruding short fiber f.

Here, in the case that the average fiber diameter is smaller than 5 micrometers, the fiber is easily bent and broken during the travel and the road surface scratching and excavating frictional force becomes insufficient. In addition, it is impossible to sufficiently generate the portion having the high road holding pressure on the tread surface 2S because a cross sectional area of the short fiber f is small. On the contrary, in the case that diameter is larger than 100 micrometers, the friction performance is deteriorated and the wiping effect is deteriorated, and the adhesion and cohesion friction is not sufficiently applied.

Further, in the case that the average fiber length is shorter than 0.05 mm, the short fiber f easily falls out from the tread surface due to the traveling and the wiping effect is reduced. On the contrary, in the case that the average fiber length is longer than 5.0 mm, it is hard to direct the short fiber f in a dispersed manner, and a workability of the rubber is reduced.

Then, in order to secure a sufficient summer performance while effectively achieving the advantage by the short fiber blended rubber, a comparatively hard rubber in which a rubber hardness Hs1 (a durometer A hardness) at a time of being measured at 25 deg. C. is set to 58 to 72 degrees is employed as a rubber base material used in the short fiber blended rubber 20G. The rubber hardness Hs1 is the same as that of the tread rubber in the conventional summer tire.

In the case that the rubber hardness Hs1 is smaller than 58 degrees, the tread rigidity becomes insufficient and a steering stability on the dry road is reduced. On the contrary, in the case that the rubber hardness Hs1 is larger than 72 degrees, the rubber itself becomes too hard, so that a damping function for reducing a shock affecting on the short fiber f at a time of road holding is deteriorated, the short fiber f is broken and the road holding between the tread surface and the ice and snow road is deteriorated, whereby the ice and snow road performance is deteriorated.

Further, in the short fiber blended rubber 20G, a blended amount of the short fiber f with respect to the rubber base material 100 weight portion is within a range between 2 and 20 weight portion. In the case that it is smaller than 2 weight portion, the number of protrusion of the short fiber f becomes too small and the ice and snow performance becomes insufficient. Further, when it is over 20 weight portion, the number of protrusion becomes too large and an actual road holding area of the rubber on the dry road is reduce, whereby the summer performance is reduced.

Figure 3:
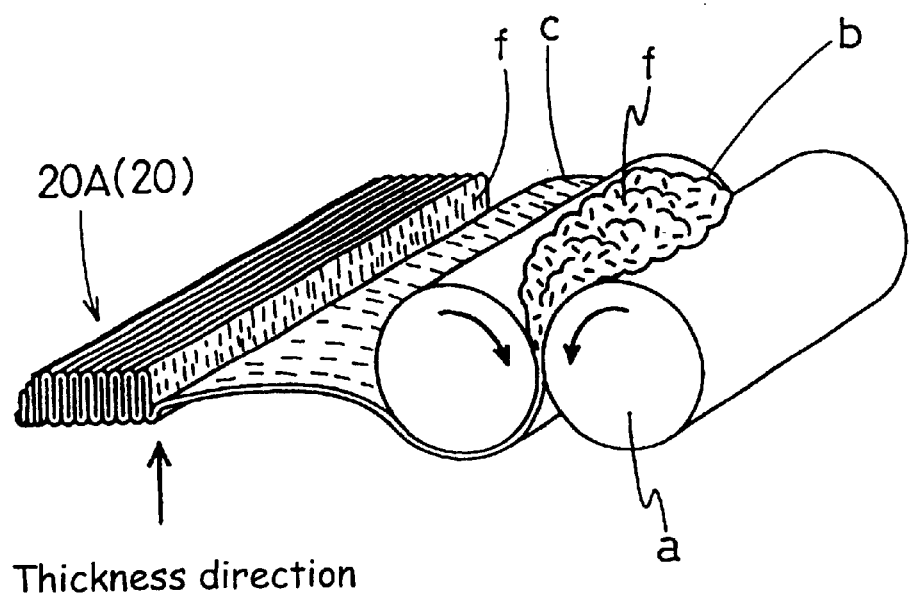
FIG. 3 is a schematic view exemplifying a method of producing a tread rubber.

In this case, the blended rubber portion 20 having the base portion 20A having the short fiber f directed in a thickness direction can be formed, for example, as exemplified in FIG. 3, by rolling a rubber composition b containing the short fiber f by means of a calender roll a and folding an obtained sheet c in a zigzag manner. At this time, it is possible to simultaneously and integrally form a surface portion 20B in which the short fiber is arranged in the tread surface direction, by adjusting a thickness of the sheet c to be thicker. However, the surface portion 20B can be formed also, for example, by independently adhere one sheet c on the surface of the base portion 20A folded in a zigzag manner, and the forming method of the base portion 20A is not particularly limited.

Since the short fiber f is directed in the tread surface direction as mentioned above, the rubber surface is reinforced so as to become hard and substantially improve the block rigidity, so that the surface portion 20B improves the summer performance. However, on the contrary, since the rubber holding is worse, the adhesion frictional force is deteriorated and the road surface scratching and excavating frictional force is reduced, so that the ice and snow performance tends to be reduced. Accordingly, in order to wear out the surface portion 20B prior to the snow season, the thickness T thereof is preferably set to be within a range between 0.2 and 1.0 mm, as before described.

Further, in the present embodiment, there is exemplified a case that a non-blended rubber portion 21 constituted by a short fiber non-blended rubber 21G containing no short fiber is provided in an inner side in a radial direction of the blended rubber portion 20.

The short fiber non-blended rubber 21G is formed by a hard rubber in which a rubber hardness Hs2 (a durometer A hardness) at 25 deg. C. is between 65 and 90 degrees and larger than the rubber hardness Hs1.

Accordingly, the tread rigidity can be set to be higher and the summer performance can be further improved. Therefore, when the rubber hardness Hs2 is less than 65 degrees, an improving effect of the summer performance is insufficient, and on the contrary, when the rubber hardness Hs2 is over 90 degrees, a shock in a compressing direction applied to the short fiber f at a time of road holding becomes large and it is not preferable because the short fiber f is introduced to be broken.

The thickness T2 of non-blended rubber portion 21 is preferably restricted to be 0.3 times or less a total thickness TO of the tread rubber 2G, in order to prevent the traveling performance and an outward appearance from being deteriorated due to an exposure at an abrasion end time.

Next, in the pneumatic tire 1 in accordance with the present invention, in order to secure a summer performance capable of corresponding to that of the conventional summer tire, the tread portion 2 in accordance with the present embodiment employs a tread pattern in which the sea area ratio Ss/S0 corresponding to the rate between an area Ss of the tread groove G and a total area S0 of the tread road contacting region, and the groove depth of the tread groove G are respectively set to be about the same as those of the conventional summer tire, that is, the sea area ratio SS/S0 is between 20 and 30% and the groove depth is equal to or less than 9 mm, as exemplified in FIG. 4.

The tread road contacting region is defined in this specification as the contacting area of the tread surface 2S of the tire contacting with the road, and the tire being in the standard loaded condition in which the tire is mounted on a standard rim and inflated to a standard pressure, and then loaded with a standard load. And the axial outermost edges of the tread road contacting region of the tire under a standard loaded condition is referred to as the tread contacting edge Te. Besides, the standard rim is the "standard rim" specified in JATMA, the "Measuring Rim" in ETRTO, the "Design Rim" in T&RA or the like, the standard pressure is the "maximum air pressure" in JATMA, the "Inflation Pressure" in ETRTO, the maximum pressure given in the "Tire Load Limits at Various Cold Inflation Pressures" table in T&RA or the like.

In case of passenger car tires, however, 180 kPa is used as the standard pressure. And the standard load is the "maximum load capacity" in JATMA, the "Load Capacity" in ETRTO, the maximum value given in the above-mentioned table in T&RA or the like.

In particular, in accordance with the present embodiment, there is exemplified the tread pattern provided with inner and outer circumferential grooves 9 and 11 extending in a peripheral direction in both sides of the tire equator C, and a plurality of lateral grooves 10 arranged between an outer edge 9e in a tire axial direction of the vertical groove 9 and a tread tire holding edge Te and communicating with the circumferential groove 9.

In accordance with the present embodiment, the lateral groove 10 mentioned above is provided with a groove wall 13A formed along a reference outline 12 corresponding to a parabola and a groove wall 13B extending outside the parabola substantially parallel to the groove wall 13A and, and is structured such that a front end is communicated with the circumferential groove 9 and a rear end thereof is open in a butless portion over the tread contacting edge Te.

In this case, the reference outline 12 mentioned above corresponds to a horizontal parabola having an apex on a peripheral line 14 a small distance H1 apart from the tire equator C and at each of positions O apart from each other at a pitch interval P of the lateral groove 10, and crosses to another reference outline 12 being adjacent in a circumferential direction at a crossing point K.

The lateral groove 10 is formed only in one side of the two circumferential sides the axis passing the position O mentioned above, and a sipe 16 formed along the reference outline 12 is provided in another side in the present embodiment. That is, the lateral groove 10 is formed in a half side with respect to a main axis of the parabola, and the sipe 16 is formed in the other half side of the parabola. The respective horizontal grooves 10 arranged in one side of the tire equator C are formed in the same side with respect to the peripheral direction.

As mentioned above, the description is given in detail of the particularly preferable embodiment in accordance with the present invention, however, the present invention is not limited to the illustrated embodiment, and the other bias structure of the radial structure can be employed. Further, various kinds of patterns can be employed as far as the tread pattern corresponding to the summer tire in which the sea area ratio Ss/S0 is set to about 20 to 30%.

Further, the tread rubber 2G can be constituted only by the blended rubber portion 20 as occasion demands, or the like. The present invention can be executed by modifying to various aspects.

Comparative Tests

Tires with a tire size of 195/65R15 having the structure shown in FIG. 1 are manufactured by way of trial experiment on the basis of a specification in Table 1, and the tires are tested with respect to an operation stability on the dry road, an operation stability on the wet road, a performance on the snow and a performance on the ice for being compared. The other specifications than the tread rubber are the same in the respective tires.

(1) Operation Stability on Dry Road (Middle Period of Use)

The tire to be tested in a state that the surface portion is abraded and the base portion is exposed is attached to four wheels of a passenger car (FR vehicle and 2000 cc) on the basis of an internal pressure (200 kpa) and a rim (15x6JJ), and is tested on a dry asphalt road surface in a tire test course. Characteristics concerning a handle response, a rigid feeding, a gripping and the like are expressed by an index obtained by setting a comparative example 1 (a conventional example) to 100 in accordance with a driver's sensuous estimate. The larger index means a better structure.

(2) Operation Stability on Dry Road (Beginning Period of Use)

Except using the tire to be tested in a state that the surface portion is exposed, the same conditions as those of the item (1) are employed, and the characteristics are expressed by the index obtained by setting the comparative example 1 (the conventional embodiment) to 100. The larger index means a better structure.

(3) Operation Stability on Wet Road

Using the vehicle in the item (1), the same test as that on the dry asphalt road surface is performed and the characteristics are expressed by the index obtained by setting the comparative example 1 (the conventional embodiment) to 100 in accordance with the driver's sensuous estimate. The larger index means a better structure.

(4) Performance on Snow

Using the vehicle in the item (1), a braking distance till the vehicle stops after suddenly braking in a four-wheel locked state during the travel at 30 km/h on a shallow snow road under an environment of temperature 0 deg. C. is measured and the characteristics are expressed by the index obtained by setting the comparative example 1 (the conventional example) to 100. The larger index means a better structure.

(5) Performance on Ice

Using the vehicle in the item (1), a braking distance till the vehicle stops after suddenly braking in a four-wheel locked state during the travel at 30 km/h on an ice road under an environment of temperature 0 deg. C. is measured and the characteristics are expressed by the index obtained by setting the comparative example 1 (the conventional example) to 100. The larger index means a better structure.

TABLE 1

| | Embodiment 1 | Embodiment 2 | Embodiment 3 | Comparative example (Conventional Example) | Comparative example 2 | Comparative example 3 | Comparative example 4 | Comparative example 5 |
|---|---|---|---|---|---|---|---|---|
| Tread Pattern | FIG. 4 | FIG. 4 | FIG. 4 | FIG. 4 | FIG. 4 | FIG. 4 | FIG. 4 | FIG. 4 |
| Tread Rubber | | | | | | | | |
| Blended Rubber Portion | | | | | | | | |
| Rubber Hardness Hs1 (Degree) | 65 | 65 | 65 | 65 | 65 | 65 | 65 | 65 |
| Directing Direction of Base Portion | *1 | *1 | *1 | — | *1 | *1 | *1 | *1 |
| Directing Direction of Surface Portion | *2 | *2 | *2 | — | *1 | *2 | *2 | *2 |
| Short Fiber | | | | | | | | |
| Average Length (mm) | 0.4 | 0.4 | 0.4 | — | 0.4 | 0.03 | 0.04 | 0.04 |
| Average Fiber Diameter (μm) | 10 | 10 | 10 | — | 10 | 10 | 3 | 10 |
| Blended Amount (Weight Portion) | 4 | 16 | 16 | — | 4 | 4 | 4 | 1 |
| Non-Blended Rubber Portion | | | | | | | | |
| Rubber Hardness Hs1 (Degree) | — | — | 75 | — | — | — | — | — |
| Thickness Ratio (T2/T0) | — | — | 0.20 | — | — | — | — | — |
| Operation Stability on Dry Road (Middle Period of Use) | 95 | 90 | 100 | 100 | 95 | 95 | 95 | 98 |
| Operation Stability on Dry Road (Beginning Period of Use) | 100 | 95 | 100 | 100 | 90 | 100 | 100 | 100 |
| Operation Stability On Wet Road | 95 | 90 | 100 | 100 | 95 | 95 | 95 | 98 |
| Performance on Snow | 110 | 120 | 115 | 100 | 110 | 103 | 103 | 103 |
| Performance on Ice | 115 | 125 | 120 | 100 | 115 | 103 | 105 | 105 |

*1 Direction Perpendicular to Tread Surface
*2 Direction Parallel To Tread Surface As shown in Table 1, it is recognized that the tire in accordance with the embodiment can widely improve the performance on the snow and the performance on the ice while keeping an excellent summer performance corresponding to that of the conventional summer tire (the comparative example 1).

Since the present invention is structure in the manner mentioned above, it is possible to achieve an excellent travel performance on the snow and ice road while keeping the travel performance on the normal road such as the wet road, the dry road and the like high.

What is claimed is:

1. A pneumatic tire comprising:
   a tread rubber forming a tread portion, said tread rubber having a blended rubber portion constituted by a short fiber blended rubber obtained by adding a nonmetal short fiber to a rubber base material forming a tread surface and having a rubber hardness Hs1 (a durometer A hardness) at 25° C. of 58 to 72 degrees; and a non-blended rubber portion,
   said short fiber being harder than an ice and having an average fiber diameter of 5 to 50 micrometers, an average length of 0.05 to 5.0 mm and a blended amount with respect to 100 parts by weight a rubber base material of 2 to 20 parts by weight; and
   the blended rubber portion being provided with a base portion obtained by directing said short fiber in a tread thickness direction, and a surface portion arranged in a radially outer side of the base portion so as to form the tread surface and obtained by directing said short fiber in a direction parallel to said tread surface, and said non-blended rubber portion having a rubber hardness Hs2 (a durometer A hardness) at 25° C. of 65 to 90 degrees which is larger than said rubber hardness Hs1 and constituted by a non-blended rubber not containing said short fiber, said non-blended rubber portion being provided in a radially inner side of said blended rubber.

2. A pneumatic tire as claimed in claim 1, wherein said tread rubber is provided with the non-blended rubber portion which has a thickness T2 and said portion is equal to or less than 0.30 times a total thickness T0 of said tread rubber.

3. A pneumatic tire as claimed in claim 1, wherein said non-blended rubber portion has a thickness T2 and said portion is equal to or less than 0.30 times a total thickness T0 of said tread rubber, said short fiber is a glass fiber or a carbon fiber, and a thickness T of said surface portion is set to 0.2 to 1.0 mm.

4. A pneumatic tire as claimed in claim 1, wherein a thickness T of said surface portion is set to 0.2 to 1.0 mm, and said short fiber is a glass fiber or a carbon fiber.

* * * * *